United States Patent [19]

Capewell

[11] 4,222,096
[45] Sep. 9, 1980

[54] D-C POWER SUPPLY CIRCUIT WITH HIGH POWER FACTOR

[75] Inventor: Dennis Capewell, Easton, Pa.

[73] Assignee: Lutron Electronics Co., Inc., Coopersburg, Pa.

[21] Appl. No.: 966,603

[22] Filed: Dec. 5, 1978

[51] Int. Cl.² ............................................. H02M 1/12
[52] U.S. Cl. ........................................ 363/44; 363/126
[58] Field of Search ............... 307/146, 321; 324/119; 363/44–48, 114, 125, 126, 128, 37

[56] References Cited

U.S. PATENT DOCUMENTS

| 3,024,415 | 3/1962 | Burklund et al. | 324/119 X |
| 3,088,065 | 4/1963 | Manteuffel | 363/37 |
| 3,978,388 | 8/1976 | deVries | 363/45 |
| 4,104,715 | 8/1978 | Lawson, Jr. | 363/37 |

FOREIGN PATENT DOCUMENTS

2417628  10/1975  Fed. Rep. of Germany ............. 363/37

Primary Examiner—William M. Shoop
Attorney, Agent, or Firm—Ostrolenk, Faber, Gerb & Soffen

[57] ABSTRACT

A d-c power supply is described which is energized from a relatively low frequency power source and produces a d-c output voltage with low ripple and high power factor. An inductance-capacitance circuit is connected in series with the a-c source and the a-c side of the rectifying element. A filter capacitor is connected to the d-c side of the rectifying element. The inductance-capacitance circuit resonates at a frequency of about three to six times the frequency of the input power supply. A plurality of circuits for carrying out the invention are disclosed.

23 Claims, 21 Drawing Figures

FIG. 7. RESONANT FREQUENCY IS 3-6 TIMES LINE FREQUENCY

FIG. 8. RESONANT FREQUENCY IS TOO HIGH

FIG. 9. RESONANT FREQUENCY IS TOO LOW

D-C POWER SUPPLY CIRCUIT WITH HIGH POWER FACTOR

BACKGROUND OF THE INVENTION

This invention relates to a d-c power supply, and more specifically relates to a novel circuit arrangement for a d-c power supply which produces low ripple d-c from a relatively low frequency a-c source, wherein the converter has an exceptionally high power factor with the use of relatively few and inexpensive components.

Numerous power supplies are known for supplying a relatively high level d-c voltage such as 300 V from a relatively low frequency a-c power line which might have a frequency of 50 Hz or 60 Hz. Such devices have almost universal application. One particular application of such a device is shown in co-pending application Ser. No. 966,604 filed Dec. 5, 1978, in which a high frequency converter is driven from the d-c output of a rectifier network which is, in turn, powered from the relatively low frequency of the a-c mains in a building or the like. Conversion of a-c power to low ripple d-c power for input to a high frequency converter can be obtained with many known circuits. However, a relatively inexpensive rectifier network is desired which can convert power to d-c at reasonable cost and in such a way that does not unduly load building wire or the power generating station that supplies the system.

Thus, the device preferably should be inexpensive in construction, easy to manufacture and reliable and should have a relatively high power factor.

The power factor of a rectifying network will be maximized when the phase difference between the line voltage and line current is minimal and further when the duty cycle of the line current is maximized. The duty cycle of the line current is the per unit time that current flows from the line during each half cycle of line voltage.

To understandd why a maximum duty cycle will maximize power factor, consider that the average power delivered from the line is:

$$P = \frac{1}{T} \int_0^T v(t) \cdot i(t) \, dt = \frac{1}{T} \int_0^T \sqrt{2} \, V \sin \omega t \cdot i(t) \, dt$$

where v is instantaneous voltage, i(t) is instantaneous current, t is time, V is rms voltage, and T is the period.

The effect of i(t) is, therefore, averaged over the cycle. However, the power factor is the ratio of the average power P to the volt ampere product $V \times I$, where I is the rms current defined as:

$$I = \sqrt{\frac{1}{T} \int_0^T i(t)^2 dt}$$

The rms current I increases for a lower duty cycle because the waveform of i(t) is more peaked or has a shorter conduction period.

Many prior art rectifier circuits will be seen to have a poor power factor because their conduction time is short.

BRIEF DESCRIPTION OF THE PRESENT INVENTION

In accordance with the present invention, a novel rectifier circuit is provided which is arranged to force the input line current to flow for most of the time during each half cycle so that the duty cycle of the current is maximized. This is done through the use of a resonant circuit connected on the a-c side of the rectifier element which is connected to the d-c load circuit. This resonant circuit resonates at a frequency of about three to six times the frequency of the input source. The use of this resonant circuit maximizes the duty cycle of the line current and thus the power factor.

The preferred resonant circuit is an inductance-capacitance circuit with the inductance in series with the a-c line and capacitance connected across the a-c lines and between the inductor and the rectifier bridge. The circuit operates to maintain the rectifier bridge in conduction for most of each half cycle, while also shaping the line current to a near sinusoid. The result is a maximum duty cycle and power factor. The values of the capacitor and inductor are chosen to best satisfy this operation. If improper values are chosen, or if the capacitance is totally eliminated, the inductor will not be able to maintain the rectifier bridge in conduction over most of the half cycle; also, the current would be out of phase with the voltage. Thus the power factor would be much lower.

The novel circuit of the invention achieves the desired result of maximizing the duty cycle without greatly attenuating the d-c voltage and also produces a very low ripple voltage. Moreover, as will be shown, there is little line voltage distortion. The invention also permits the use of a non-critical electrolytic filter capacitor in the rectifier d-c circuit.

The novel arrangement of the invention also inherently limits in-rush current to the circuit and prevents false tripping of the circuit breaker when the system is turned on. The circuit also provides good power factor for wide variations of load current and thus is very useful in applications in which the load current is to be widely varied as in a lamp dimming application. The circuit also provides protection of the semiconductor rectifier diodes from transient overvoltages in the supply line. It will also be seen that the circuit uses all passive components and does not require complicated switching or control schemes.

DETAILED DESCRIPTION OF THE DRAWINGS

Figure 1:
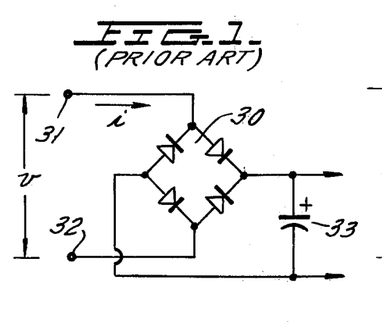
FIGS. 1 to 3 show circuits representing prior art types of d-c power supply arrangements.
Figure 2:
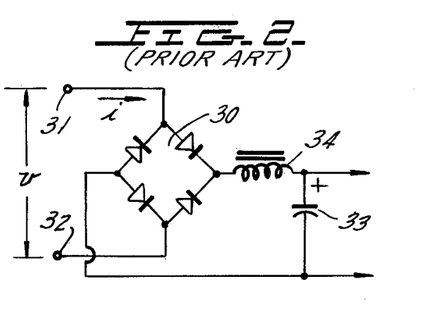
Figure 3:
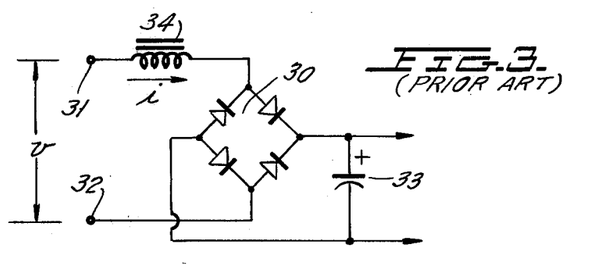

Referring first to FIGS. 1 to 3, several typical, well-known power supply circuits are disclosed. The simple arrangement of FIG. 1 is a single phase full-wave bridge-connected rectifier 30 which is connected to terminals 31 and 32 of a 60 Hz source. A large electrolytic capacitor 33 is connected across the d-c output of the bridge 30 and the output is then connected to a suitable d-c load.

It is well known that the circuit of FIG. 1 has a low duty cycle and very low power factor and, therefore, unduly loads the a-c line. The circuit also has a disadvantage that large peak currents are drawn which greatly disrupt the a-c line voltage. Moreover, there will be a large in-rush current to charge the capacitor when the circuit is first turned on which might falsely trip branch protection devices.

The circuit of FIG. 1 is frequently modified as shown in FIGS. 2 and 3 by the addition of a large inductor 34 either in the d-c side of the rectifier 30 as in FIG. 2 or in the a-c side as in FIG. 3. As will be later seen, this inductor is much larger than the one which is used in connection with the present invention. When the inductor is introduced on the d-c side as shown in FIG. 2, the line current approaches a square wave, whose power factor must be less than 0.9. When the inductor is introduced on the a-c side, the power factor becomes progressively lower as the inductance is increased.

Another disadvantage of the circuit of FIG. 3 is that the d-c voltage will be attenuated so that, for a given power output, the output current must be relatively high. In any converter, losses are mostly due to current and, therefore, the efficiency of the circuit is reduced.

Figure 4:
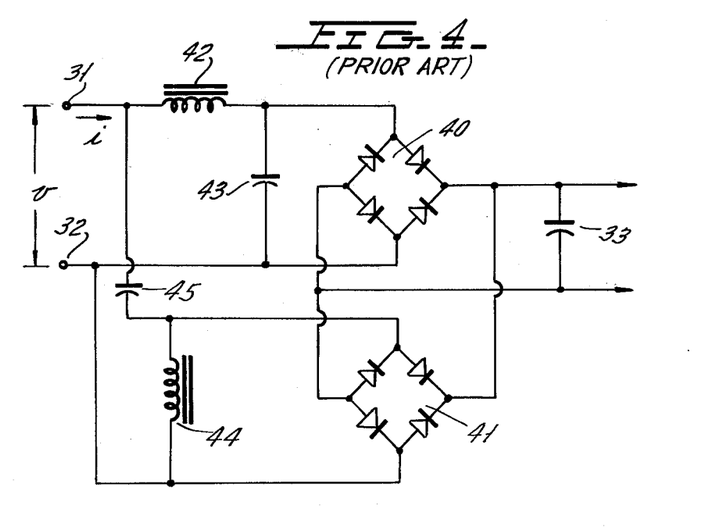
FIG. 4 is a circuit diagram of a relatively high power factor circuit.

A circuit which improves power factor is that shown in FIG. 4. The circuit of FIG. 4 has two bridge rectifiers 40 and 41. The bridge rectifier 40 has an inductor 42 connected in series with one of the a-c terminals and a capacitor 43 is connected across the a-c terminals of the bridge.

An inductor 44 is connected across the a-c terminals of bridge 41 and capacitor 45 is connected in series with the a-c bridge terminals of bridge 41. The resonant circuits are each tuned to the line frequency. Each circuit does not yield a high power factor, but the combination of the two circuits yields a high power factor. The bulk and cost of the components shown in FIG. 4 greatly exceeds the bulk and cost of the inductor and capacitor of the present invention as will be later seen.

Figure 5:
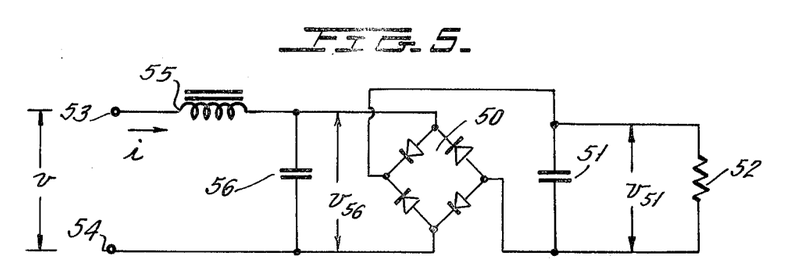
FIG. 5 is a circuit diagram of a power supply arrangement of the present invention.

The novel circuit of the present invention is illustrated in FIG. 5. In FIG. 5, the circuit includes a single phase bridge-connected rectifier 50 (which could be any other desired type of rectifier) which has its output terminals connected to an electrolytic filter capacitor 51. The output of the filter capacitor 51 is then connected to a suitable d-c load represented by the load impedance 52.

In accordance with the invention, the relatively low frequency input source may be a 50 Hz or 60 Hz power source connected to terminals 53 and 54. A tuned circuit consisting of inductor 55 and capacitor 56 is connected in this input circuit on the a-c side of rectifier 50. The inductor 55 and capacitor 56 are preferably tuned at a frequency of about three to six times the frequency of the low frequency source connected to terminals 53 and 54. Typically, inductor 55 may have a value of 30 millihenrys and capacitor 56 may have a value of 10 microfarads, which yields a ratio of 4.8 to the line frequency of 60 Hz. This is to be contrasted to the values used for inductor 42 and capacitor 43 in the prior art circuit of FIG. 4, which are typically 150 millihenrys for inductors 42 and 44 and 50 microfarads for capacitors 43 and 45 for the same load impedance.

Broadly stated, the operation of the circuit of the invention is such that, in the initial part of the half cycle of input voltage, when the voltage across capacitor 51 exceeds the voltage on capacitor 56, the rectifier 50 is reverse-biased and forces the line current to flow into capacitor 56. The components 55 and 56 resonate, thereby causing line current to flow as a short half cycle pulse in the initial portion of the half cycle of the input voltage until the voltage on capacitor 56 exceeds the voltage on capacitor 51. The rectifier 50 becomes forward-biased and allows the line current to flow into capacitor 51 and the load impedance 52. This provides a more uniform current flow in the a-c line over the one-half cycle increasing the duty cycle and improves the power factor of the circuit.

Figure 6A:
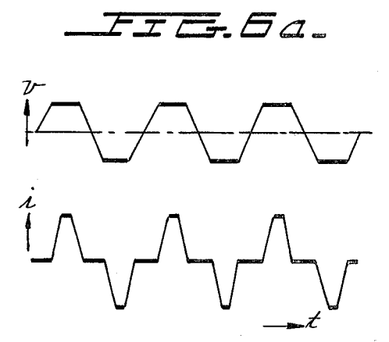
FIG. 6a illustrates the voltage and current characteristics of the circuit of FIG. 1.
Figure 6B:
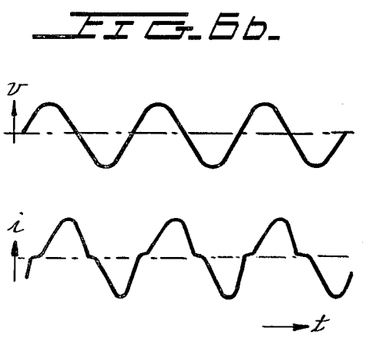
FIG. 6b shows the voltage and current characteristics of the circuit of FIG. 3.
Figure 6C:
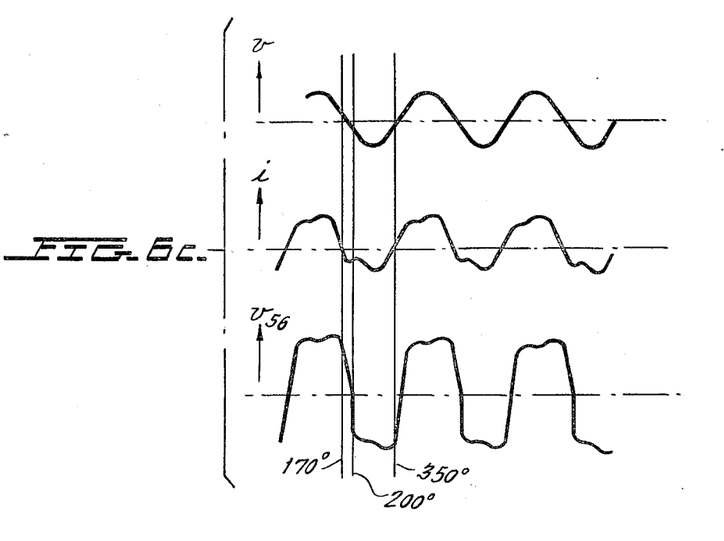
FIG. 6c shows the voltage and current characteristics of the circuit of FIG. 5 using the input tuned circuit of the invention and having a relatively high power factor and shows the voltage across the input capacitor.

The operation of the circuit of FIG. 5 can also be understood from a consideration of the voltage and current characteristics, shown as a function of time, in FIGS. 6a, 6b and 6c. The characteristic current and voltage in FIG. 6a is for a circuit of the type of FIG. 1 which is similar to that of FIG. 5, but without the inductor 55 or capacitor 56.

In FIG. 6a, representing the line circuit of FIG. 1, the line current is sharply peaked and the duty cycle is low so that the power factor of the circuit is very poor. Conventionally the power factor of the circuit of FIG. 1 will be of the order of 0.4 to 0.7. In addition, the line voltage in FIG. 6a is distorted and flattened during intervals corresponding to the current peak.

If an inductor is added to the circuit in FIG. 1 as shown, for example, in FIG. 3, the voltage and current characteristics change to those of FIG. 6b. In FIG. 6b, it will be seen that the current characteristic is somewhat less peaked than that of FIG. 6a and the conduction time is longer but the power factor of the circuit because of the displacement of the peak in the current with respect to the voltage is still poor and would be from about 0.5 to 0.75 for a reasonably acceptable ripple factor. However, the use of the relatively large inductor 34 creates many other problems. Thus, the d-c output voltage is lowered considerably so that, for the same output power, additional current must flow thereby resulting in reduced efficiency. Furthermore, the improved power factor is obtained at the expense of increasing the ripple in the output. Thus, the power factor is increased to about 0.9 when using the circuit of FIG. 3, the ripple might be twenty percent notwithstanding a severely reduced output voltage. A circuit of this type is shown in:

Peter Richman, *Wave Factors and Power Factor for General Voltage and Current Waveforms.* IEEE Transactions on Industrial Electronics and Control Instrumentation, Vol. IECI-22, No. 3, August 1975, pp. 420–424.

Peter Richman, *Wave Factors for Rectifiers with Capacitor Input Filters, and Other High Crest-Factor Loads.* IEEE Transactions on Industrial Electronics and Control Instrumentation, Vol. IECI-21, No. 4, November 1974, pp. 235–241.

The novel configuration of the present invention as shown in FIG. 5 provides, through a series of complex and unexpected interactions, advantages considerably beyond those of the above-mentioned circuits. These can be explained with reference to FIG. 6c. Referring to the central curve in FIG. 6c, it will be seen that the current is drawn over virtually all of the full half cycle as compared to the currents shown in FIGS. 6a and 6b. The line voltage at terminals 53 and 54 is shown in the upper curve of FIG. 6c and approaches zero at approximately 170° in the phase. At this point the voltage on capacitor 56 becomes less than the voltage on capacitor 51 so that the diode bridge 50 becomes reverse-biased. The current i shown in FIG. 5, therefore, can flow only into capacitor 56. When the current reverses at about 180°, the current causes capacitor 56 to charge very suddenly in an opposite direction. Inductor 55 and capacitor 56 resonate at their period which is about ⅓ to 1/6 of the period of the voltage of the line connected to terminals 53 and 54. The resonant period will be approximately 2.8 to 5.5 milliseconds as compared to the period of 16.6 milliseconds for the 60 Hz sine wave. The sudden flow of charge into capacitor 56 causes the voltage of capacitor 56 to swing sharply negative as shown in the lower curve of FIG. 6c, exceeding the voltage on capacitor 51 and to again forward-bias the diode bridge 50. The current i continues to flow from the inductor 55 into both the capacitor 56 and capacitor 51 until nearly the end of the half cycle at angle 350°. At that time, the diode bridge 50 becomes reverse-biased, the current i flows into the capacitor 56 and its voltage reverses within the period set by the resonant frequency of inductor 55 and capacitor 56. Thus, current conduction is affected over practically all of both half cycles taken as an example and is in phase with the a-c voltage, thereby giving good power factor with high output voltage and low ripple.

The following will also explain why the a-c current remains in phase with the a-c input voltage, why the voltage across capacitor 56 is a square wave in FIG. 6c, and the significance of these two factors.

The current i and the line voltage v are both near zero and the voltage of capacitor 56 has just passed its maximum value at 170°. The rectifier diode bridge 50 is reverse-biased. The energy of the capacitor 56 which is ½ $CV^2_{56}$ discharges into the inductor 55 so that at about 200° the energy of the inductor (and its current) reaches its final maximum value of ½ $LI^2$. The capacitor voltage passes through zero indicating that the capacitor is discharged. Because the capacitor 56 is disconnected from the capacitor 51 and the load impedance 52 by the diode bridge rectifier, the ringing between capacitor 56 and inductor 55 has little energy dissipation. The inductor 55 then recharges the capacitor 56 to its full voltage in the reverse direction at about 230°. However, the rectifier diode bridge 50 now becomes forward-biased. The inductor current i, instead of reaching zero, now continues to flow into the combination of the capacitors 56 and 51 and impedance 52 until it reaches 350°, when the process repeats.

By selecting the values for inductor 55 and capacitor 56 so that the energy of inductor 55 is completely delivered to capacitor 56 at the time that the rectifier diode bridge 50 becomes forward-biased, the circuit requires no energy exchange with the line. That is, the stored energy is exchanged between the inductor 55 and the capacitor 56 each half cycle. This is also the condition for the input current and voltage from the lines 53 and 54 to appear at a unity power factor. The energy flow from the line just supplies the load. No energy is delivered to the circuit which is stored in the inductor or capacitor and returned to the line at another point in the cycle.

When the rectifier diode bridge is forward-biased during each half cycle, the capacitor 51 receives current i from the inductor 55. This current replenishes the charge and energy of capacitor 51 that is required by the load impedance 52 over the entire half cycle. Since capacitor 51 is much larger than capacitor 56, the voltage of capacitor 51 rises only slightly as it receives its energy. The result is that the voltages on capacitor 51 and capacitor 56 during most of each half cycle remain nearly flat topped. Furthermore, the energy of the capacitor 51 cannot be returned to the line during the half cycle, so that capacitor 51 does not contribute to the energy exchange process between inductor 55 and capacitor 56.

Figure 7:
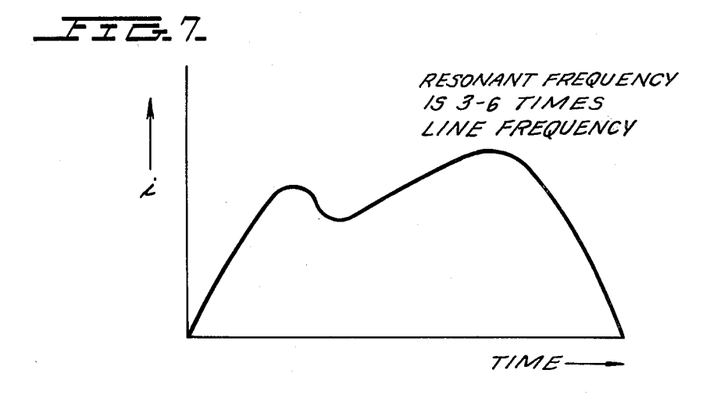
FIGS. 7, 8 and 9 specifically illustrate current wave shape for different resonant frequency ranges.
Figure 8:
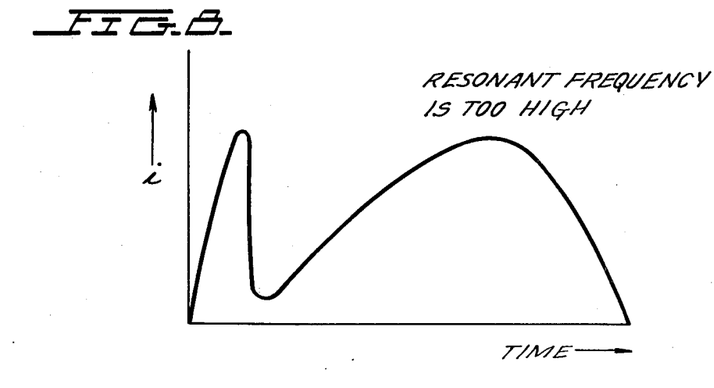
Figure 9:
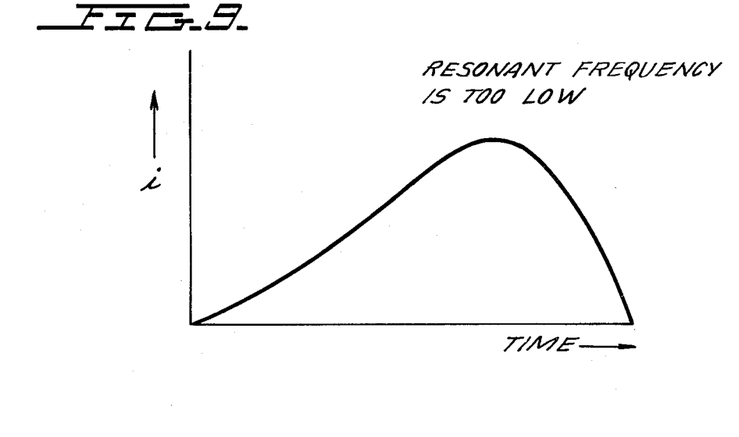

In summary, the desired current wave shape shown in FIG. 7 will be produced when the resonant frequency of inductor 55 and capacitor 56 is about 3 to 6 times the frequency of the input line. This wave form gives good power factor. By contrast, if the resonant frequency is higher than about six times the line frequency, the current wave shape will be that shown in FIG. 8 in which the duty cycle is not high enough, and will have a poor power factor. If the resonant frequency is lower than about three times the line frequency, the current wave shape will be that shown in FIG. 9 which again has a low duty cycle and poor power factor.

Figures 10, 11, 12:
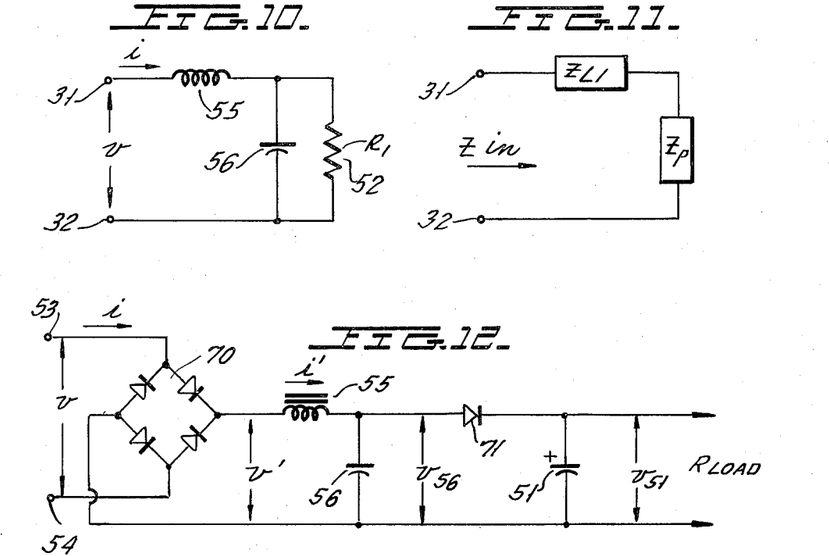
FIGS. 10 and 11 are circuit diagrams which assist the description of the theory of operation of the circuit of the present invention.
FIG. 12 shows a second embodiment of the present invention wherein the input voltage is rectified before conditioning by the tuned circuit of the invention and wherein the tuned circuit has a rectifier element in its output circuit.

To show that the current i is in phase with the line voltage v in the circuit of FIG. 5, reference is made to the diagrams of FIGS. 10 and 11. Referring first to FIG. 10, the circuit is schematically illustrated as consisting of the inductor 55, the capacitor 56 and the load resistor 52. The inductor 55 is assumed to be 30 millihenrys. Capacitor 56 is assumed to be 10 microfarads and the load resistance $R_1$ of load 52 is assumed to be 43 ohms. The input impedance $Z_{in}$ to the circuit of FIG. 11 can be evaluated in terms of the fundamental component of the current i using the impedance models $Z_{L1}$ and $Z_p$. The impedance $Z_p$ is:

$$Z_p = \frac{Z_{C1} \times R_L}{Z_{C1} + R_L}$$

where $Z_{C1}$ is the reactive impedance of capacitor 56 at 60 Hz.

Using the component values given above for the inductor 55, capacitor 56 and load resistor 52 at 60 Hz, it can be shown that the rms current i is 6.58 amperes with a phase angle of −6° with respect to the line voltage. This result indicates a power factor of about 0.995, which confirms actual measurements on the circuit.

Analysis of the circuits of FIGS. 10 and 11 shows that close to unity power factor can be obtained for a range of reactance ratios for inductor 55 from $X_L/R=0.15$ to $X_L/R=0.4$ by using resonant frequencies for inductor 55 and capacitor 56 from 6.6 to 2.2 times the line frequency. The selection of the $X_L/R$ reactance ratio depends upon the ripple that can be tolerated on the voltage of capacitor 51, and the power factor requirements at less than rated load currents.

The above analyses shown that the current i has a long duty cycle, and is substantially in phase with the voltage v. Consequently:

1. An extremely high power factor is obtained.
2. The inductance 55 and capacitance 56 used in the circuit of FIG. 5 are much smaller than similar components of comparable circuits. That is, the addition of the capacitor 56 reduces the needed energy storage in inductor 55 for a given load so that the size of the inductor 55 is considerably reduced.
3. The circuit of FIG. 5 operates without introducing high peak currents because the input current i has a long duty cycle and is continuous. Thus line voltage waveform distortion is not introduced.
4. The maximum value of capacitor 51 is not critical because its value is so much larger than that of capacitor 56 that its effect on the further increase of the output voltage during conduction of rectifier 50 is insignificant. Consequently, relatively inexpensive electrolytic capacitors can be used for the capacitor 51.
5. In-rush current is inherently limited because the inductor 55 is of such a magnitude and is in series with the line that the peak value is controlled. Also, high power factor generally gives low in-rush current and low transient voltages.
6. The output voltage of the circuit is not greatly attenuated because the value reached by the voltage on capacitor 56 depends on the values chosen for the inductance 55 and capacitor 56. This is a result clearly unobvious to those in this art.
7. Good power factor, for example greater or equal to 0.8, is retained even for wide variations, for example 3 to 1 in the resistance $R_1$ of the load 52. Therefore, the exact value of the load resistance is not critical to the operation of the circuit.
8. Transient overvoltages from the line are suppressed before they can damage the semiconductor diodes of the rectifier 50.
9. The ripple output voltage is minimized because the capacitor 51 is much larger than the capacitor 56.
10. The circuit is inexpensive and extremely reliable because it uses all passive components of relatively small size and does not require complicated switching and control schemes.
11. Good power factor is also retained for wide variations in dimming of a given load. For example, when dimming from 100% to 20% of full intensity, power factor goes from above 0.9 to about 0.8 (an acceptable power factor).

FIG. 12 shows an embodiment of the invention which differs from that of FIG. 5 but wherein the same theory of operation is used. In FIG. 12, power factor conditioning is done on the d-c side of the circuit rather than on the a-c side. Thus, the circuit has a single-phase and full-wave bridge-connected rectifier 70 connected directly to the terminals 53 and 54 of the input a-c source. The tuned circuit consisting of inductor 55 and capacitor 56 is connected across the d-c terminals of bridge 70 and the output of the tuned circuit is connected to the a-c side of diode 71. The output of the diode 71 is then connected to the filter capacitor 51 and the circuit then is connected to the d-c load which is to be operated from the power supply.

The circuit of FIG. 12 improves power factor by forcing current flow in the initial portion of the half cycle and by causing the a-c current to be drawn over virtually all of the full cycle. The theory of operation disclosed above in connection with the circuit of FIG. 5 holds true for the circuit of FIG. 12 in that, at 170° conduction time, the voltage on capacitor 56 becomes less than the voltage on capacitor 51 so that rectifier 71 now becomes back-biased. Thus, a-c current can now flow through the rectifier only into capacitor 56, thus giving capacitor 56 a sudden charge and reversal of voltage. As before, this sudden charge fills in the initial portion of the a-c current waveform, making it continuous in nature throughout the cycle. Thus, the arrangement of FIG. 12 differs from the arrangement of FIG. 5 only in that the input voltage is rectified before being conditioned by the tuned circuit consisting of components 55 and 56.

Figure 13:
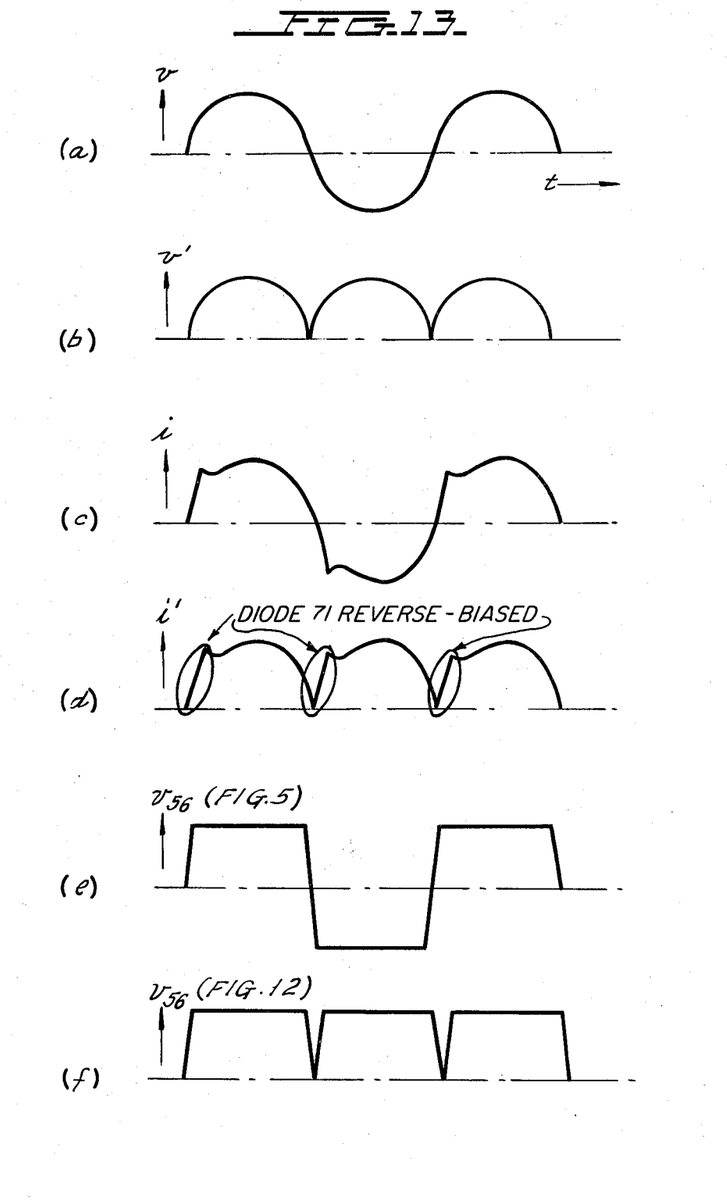
FIGS. 13a to 13f show voltage and current wave shapes present in the circuit of FIG. 12 plotted on a common time base.

The operation of the circuit of FIG. 12 is shown in connection with FIGS. 13a to 13f in which the various voltage and current waveforms of the circuit are shown on a common time base. FIG. 13a shows the sine wave input voltage v which is connected to terminals 53 and 54. FIG. 13b shows the rectified voltage v' which is at the output d-c terminals of the bridge 70. The current flow i into the bridge 70 is shown in FIG. 13c and is similar to the current waveforms in FIGS. 8 and 9. FIG. 13d shows the rectified current i' with regions at which diode 71 is reverse-biased being shown by circling. FIG. 13e shows the square wave output voltage $v_{56}$ which existed across capacitor 56 in the arrangement of FIG. 5 where the voltage is an a-c square wave. By comparison, the output voltage on capacitor 56 in FIG. 12 is a rectified square wave as shown in FIG. 13f. As can be seen from the waveforms of FIGS. 3a to 13f, all of the advantages described previously in connection with the circuit of FIG. 5 hold for the circuit of FIG. 12. The circuit of FIG. 12, however, has three additional advantages over the arrangement in FIG. 5:

1. The inductor 55 is in the d-c part of the circuit and thus will have significantly less core loss since there is a smaller a-c component of flux excursion. Thus, the circuit will be more efficient.
2. The inductor 55 will be much quieter than its a-c counterpart in FIG. 5.
3. The inductor 55 can be a "swinging choke" which further improves power factor during dimming. A swinging choke is a non-linear inductor whose inductance increases as current decreases. The effect of this increasing inductance will compensate for a capacitive effect that occurs during dimming or reduction of load current.
4. The inductor 55 can incorporate a permanent magnet to bias the magnetic circuit against the direct current and thus reduce its size.

The above advantages are, of course, offset by the need for the additional diode or rectifier element 71.

The circuits of FIG. 14 to 19 which are to be described hereinafter all include features to maintain a high power factor (greater than about 0.9) throughout a wide range of variation of load current as due to dimming of a lamp load. The circuit of FIG. 14 is very similar to that of FIG. 5 and similar numerals identify similar components in the two circuits.

In the arrangement of FIG. 5, as the system is dimmed or load current is decreased, the power factor decreases somewhat since the circuit becomes somewhat capacitive. The peak energy of capacitor 56 exceeds the peak energy of the inductor 55. To counteract this effect, the circuits of FIGS. 14 and 15 provide a current controlled inductor arrangement. Thus, in FIG. 14 an inductor 80 is provided where the inductor 80 has a d-c biasing winding 81 and a biasing source 82 which can be operated to vary the inductance of the inductance coil 80. Thus, in the system of FIG. 14, the inductance of member 80 can be more or less varied in order to counteract the effect of added capacitance during dimming. If desired, the control which regulates load current can simultaneously adjust the bias 82 to obtain the desired compensation.

Figure 14:
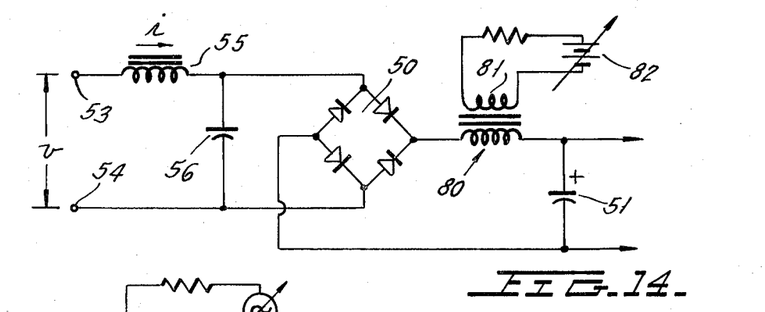
FIGS. 14 and 15 show additional embodiments of the invention which employ voltage controlled inductors to further improve power factor.
Figure 15:
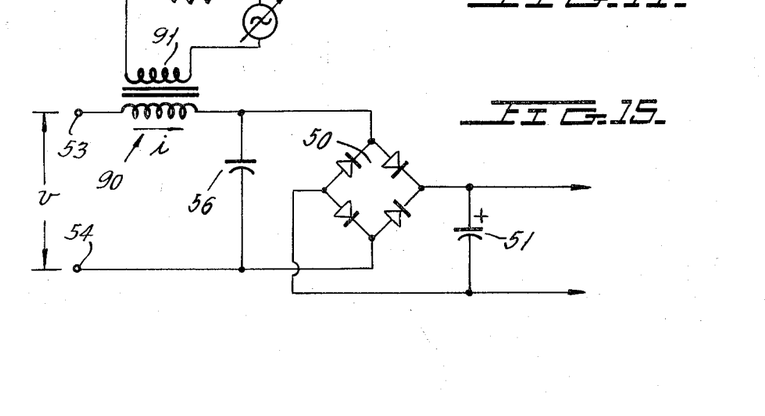

In FIG. 15, the inductor 55 of FIG. 14 is replaced by a current controlled inductor 90 which acts both as the resonating inductor 55 in FIG. 5 and as the compensating inductor 80 of FIG. 14 in a single component. Note that in FIG. 15 the control winding 91 of the inductor 90 is connected to a variable source of a-c controlled power 92 in the usual manner well known to those skilled in the art.

Figure 16:
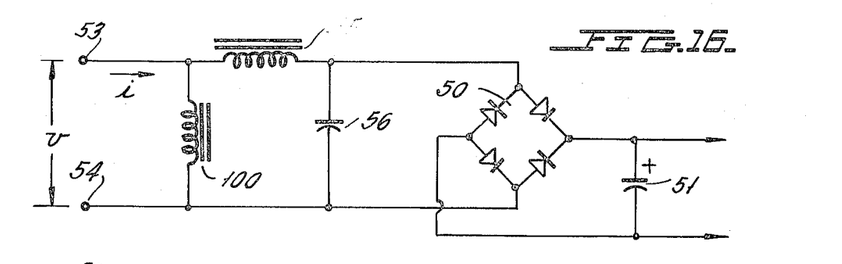
FIGS. 16 to 19 show further embodiments of the invention wherein a high power factor is maintained under extensive load changes.
Figures 17, 18:
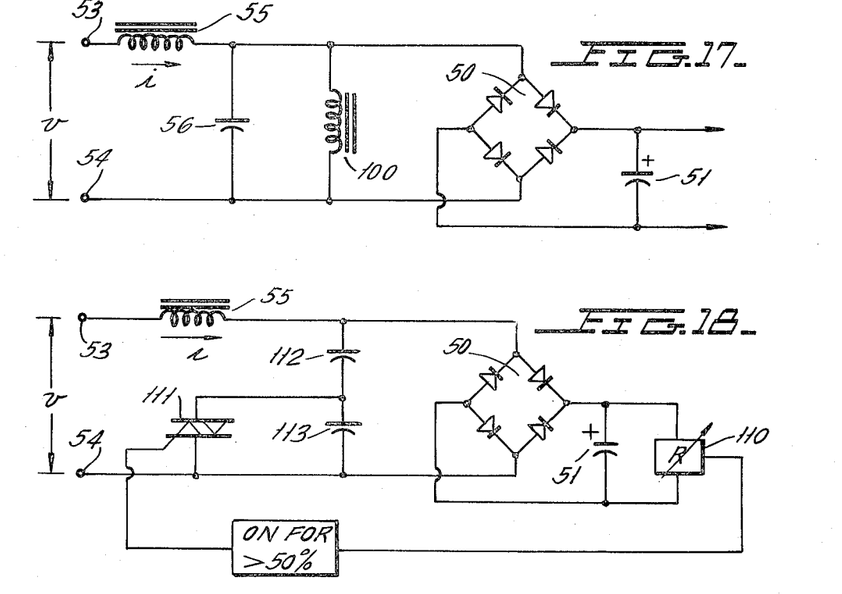

The circuits of FIGS. 16 and 17 are similar to those of FIGS. 5, 14 and 15 and like components have received similar identifying numerals. In the circuits of FIGS. 16 and 17, however, the capacitive current during dimming or reduction of output current is compensated by the added parallel inductor 100 which can be connected either in front of or behind the resonant circuit consisting of inductor 55 and capacitor 56 (FIGS. 16 and 17, respectively).

Figure 19:
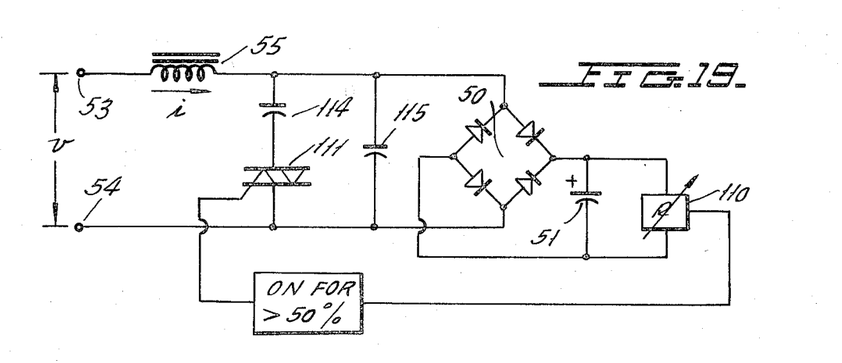

FIGS. 18 and 19 show a circuit arrangement wherein a portion of the capacitance of the capacitor in the resonant circuit is switched in and out of the circuit for power factor correction purposes. Again, in FIGS. 18 and 19, components identical to those of FIG. 5 have been given identical numerals. However, the output load circuit in each of FIGS. 18 and 19 is schematically illustrated as the adjustable load 110 which produces some output of any desired type for turning on a triac 111 or other suitable switching means when the output current is greater than about 50% of its rating.

In FIG. 18, the capacitor 56 of FIG. 5 is replaced by two series-connected capacitors 112 and 113 and the capacitor section 113 is in parallel with the triac 111 so as to be shorted by the triac when the triac 111 is on. Thus, when the output current of the power supply exceeds some given value, the total capacitance in resonance with the inductor 55 is equal to that of capacitor 112. However, when the load current reduces below 50%, for example, capacitor 113 is switched into the circuit in series with capacitor 112, thereby to decrease the total capacitance which resonates with inductor 55. This will maintain a relatively high power factor for the circuit under a high dimming condition as where the circuit is used for the control of lamps as disclosed in previously mentioned co-pending application Ser. No. 966,604, filed Dec. 5, 1978.

The circuit of FIG. 19 operates in a substantially identical manner except that the capacitors which resonate with inductor 55 are parallel-connected capacitors 114 and 115. Capacitor 114 is in series with the triac 111 so that when current output to load 110 is greater than about 50%, capacitors 114 and 115 are connected in parallel and the total capacitance resonating with inductor 55 is the sum of the capacitances of capacitors 114 and 115. The capacitor 114 is removed, however, when triac 111 turns off in order to obtain an appropriate adjustment of the power factor of the circuit.

Although there have been described preferred embodiments of this invention, many variations and modifications will now be apparent to those skilled in the art. Therefore, this invention is to be limited, not by the specific disclosure herein, but only by the appended claims.

What is claimed is:

1. A high power factor power supply circuit comprising, in combination:
    an a-c supply circuit having a relatively low a-c frequency;
    a tuned circuit comprising an inductor and capacitor having respective values which are tuned to resonate at a frequency which is higher by less than about one order of magnitude than said relatively low a-c frequency;
    coupling means for connecting said a-c supply circuit to said tuned circuit;
    a rectifier means having a-c input means connected to said tuned circuit and having a d-c output circuit means; said inductor being connected in series with said rectifier means; said capacitor being connected in shunt with said rectifier means and having one terminal connected to the junction between said inductor and said rectifier means;
    and an output capacitor connected to said d-c output circuit means.

2. The circuit of claim 1 which further includes load circuit means connected to said d-c output circuit means; said load circuit means drawing variable current from said a-c supply circuit.

3. The circuit of claim 1 wherein said rectifier means comprises a single phase, full-wave bridge-connected rectifier; and wherein said coupling means includes connection wires for connecting said a-c supply circuit to said inductor and capacitor respectively.

4. The circuit of claim 1 wherein said a-c supply circuit has a sinusoidal voltage and a frequency of 50 Hz to 60 Hz.

5. The circuit of claim 1 wherein said tuned circuit has a resonant frequency of about 3 to 6 times said relatively low frequency.

6. The circuit of claim 1 wherein said coupling means includes a second rectifier means.

7. The circuit of claim 1 wherein said output capacitor is an electrolytic capacitor.

8. The circuit of claims 1, 2, 3, 4, 5, 6 or 7 wherein the wave shape of the current drawn from said a-c supply is approximately in phase with the voltage thereof, and wherein said current has a long duty cycle.

9. The circuit of claim 2 which further includes variable inductance means connected in said circuit to compensate for increased capacitive reactance in said circuit when output d-c current is reduced.

10. The circuit of claim 2 which further includes variable capacitance means for changing the capacitance of said capacitor as the output d-c current is reduced.

11. A power supply circuit having a high power factor; said circuit comprising, in combination:

input a-c power terminal means for connection to an a-c source having a given frequency;

a rectifier means having a-c and d-c terminals;

an output capacitor connected across said rectifier means d-c terminals;

an inductor connected between one of said a-c power terminals and one of said a-c terminals of said rectifier means;

a second capacitor connected across said rectifier means a-c terminals;

said inductor and said second capacitor being resonant at a frequency which is a multiple of about three to six times said given frequency;

said output capacitor being substantially larger than said second capacitor.

12. The power supply of claim 11 which includes second rectifier means connected directly to said a-c power terminal means for supplying rectified power to said inductor and said second capacitor.

13. The power supply circuit of claim 11 or 12 which further includes load circuit means connected across said output capacitor for drawing a variable current from said a-c power terminal.

14. The power supply circuit of claim 11 or 12 wherein said rectifier means is a single phase, full-wave bridge-connected rectifier.

15. The power supply circuit of claim 12 wherein said rectifier means is a diode and wherein said second rectifier means is a single phase bridge-connected rectifier.

16. The power supply circuit of claim 11 which further includes a second inductor connected across said a-c power terminal means.

17. The power supply circuit of claim 11 which further includes a second inductor connected across said a-c terminals of said rectifier means.

18. A high power factor supply circuit comprising:

a-c supply circuit means having any particular frequency;

tuned circuit means including a capacitor means and inductor means resonant with one another at a frequency of from about three to six times said particular frequency;

rectifier means having a-c input means connected to said tuned circuit means and having d-c output means;

second capacitor means connected to said d-c output means;

and output circuit means connected across said second capacitor means.

19. The circuit of claim 18 wherein said inductor means, capacitor means and second capacitor means have respective values that have such relation to each other that the current of said a-c supply circuit means has an increased magnitude in the first portion of each half cycle.

20. The circuit of claim 18 wherein said rectifier means comprises a single phase, full-wave bridge-connected rectifier; and coupling means including connection wires for connecting said a-c supply circuit means to said inductor means and capacitor means respectively.

21. The circuit of claim 18 wherein said a-c supply circuit means has a sinusoidal voltage and a frequency of 50 Hz to 60 Hz.

22. The circuit of claim 18 wherein said second capacitor means is an electrolytic capacitor.

23. The circuit of claims 18, 19, 20 or 21 wherein the wave shape of the current drawn from said a-c supply circuit means is approximately in phase with the voltage thereof, and wherein said current has a long duty cycle.

* * * * *